May 25, 1937.  W. I. JONES  2,081,871
FASTENER SECURED INSTALLATION
Original Filed Aug. 16, 1934
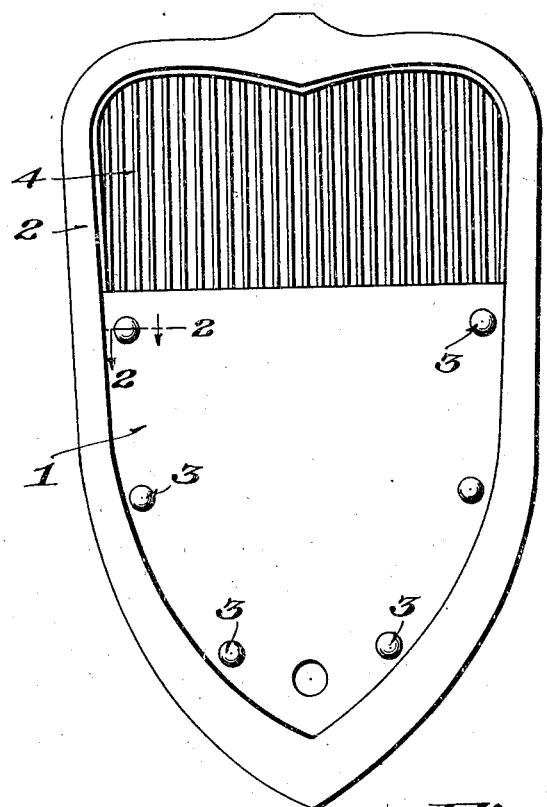
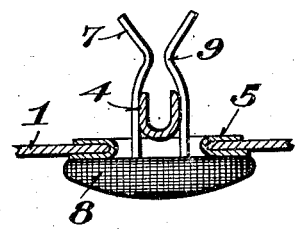
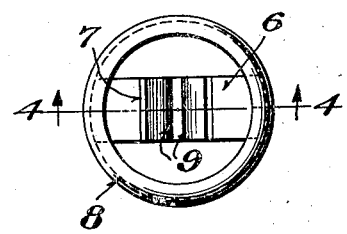
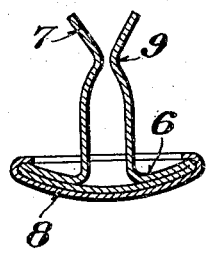
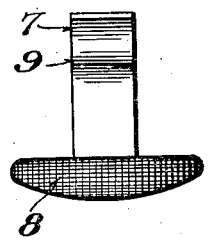
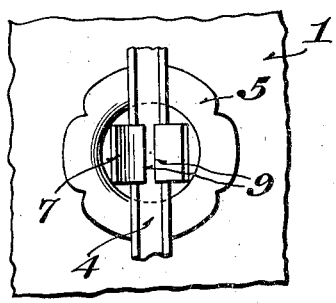
Inventor
Walter I. Jones Patented May 25, 1937

2,081,871

UNITED STATES PATENT OFFICE 2,081,871

FASTENER SECURED INSTALLATION

Walter I. Jones, Arlington, Mass., assignor to United-Carr Fastener Corporation, Cambridge, Mass., a corporation of Massachusetts Original application August 16, 1934, Serial No. 740,084. Divided and this application November 5, 1936, Serial No. 109,341. In Great Britain July 30, 1935

2 Claims. (Cl. 257—132)

My invention relates to improvements in winter front cover installations for automobile radiators and the like and aims generally to improve existing installations.

In the drawing which illustrates a preferred form of my invention

Fig. 1 is a front view of a complete installation showing the use of my novel fasteners;

Fig. 2 is an enlarged section taken on the line 2—2 of Fig. 1;

Fig. 3 is an enlarged end view of a form of my novel fastener;

Fig. 4 is a section taken on the line 4—4 of Fig. 3;

Fig. 5 is a side view of the fastener shown in Figs. 3 and 4; and

Fig. 6 is an enlarged rear view of a fragment of the installation shown in Fig. 1, including one fastener and support, and the adjacent part of the cover.

The object of my invention is to provide a flexible cover for the radiators of automobiles that may be used in cold weather to prevent freezing of the cooling liquid and to allow the engine to heat up to proper temperature more rapidly. For some time it has been the practice of automobile manufacturers to provide their cooling systems with thermostats which do not allow the liquid to circulate in the radiator until the engine is warm. Obviously, then, if a motor is started and run in cold weather the danger of freezing the cooling liquid when first starting out is greatly increased, since the water in the radiator is exposed to a steady stream of cold air. Furthermore, with the advent of radiator grilles on the more modern motor vehicles, it is difficult to attach a cardboard or flexible cover to the grille because the rear side is inaccessible. Therefore the types of fastening members used to attach covers directly to the radiators are not usable, at least not conveniently, as fastening means for radiator grille covers. My invention provides a flexible cover which may be attached to the radiator grille by simple snap fasteners easily and quickly, and which may be adjusted, on many types of cars, to cover more or less surface as desired without removing the fasteners.

Referring now to the accompanying drawing, I have shown a flexible cover 1 cut to the proper shape and covering as much of the radiator as is desired. This cover may be made of any suitable material such as waterproofed canvas or imitation leather such as is used in motor vehicle tops. Securing this cover 1 to the grille 2 are a plurality of fasteners 3, which are located in apertures in the cover and engage the underlying bars 4 of the grille, as best shown in Figs. 2 and 6. I have also provided a grommet 5 to reinforce the apertures in the cover.

The radiator grilles forming a part of motor vehicles are formed of spaced rigid bars 4, usually of U-shaped cross section and having spaced parallel flat sides of substantial width.

According to the invention the fastener may be simple and strong and made from a single piece of spring metal. This fastener is easily engaged with the grille bars and is slidable thereon by virtue of its spring grip and its flat engaging arms. The specific form illustrated is formed by bending a strip of flat spring steel or other suitable material in the shape shown in Fig. 4. It may have a head portion 6 and a pair of yieldable arms 7 extending from the head and formed by bending portions of the free ends of the strip until they lie along one face of the head for a short distance as shown in Fig. 4. The ends of the strip may be then bent directly away from the head in substantially parallel planes. Towards their ends they may be bent toward each other in gradually increasing curves until they are very close together and then bent sharply away from each other at their extremities. A cap 8 advantageously is attached to the head for the purpose of increasing the rigidity thereof and providing a better appearance and also to make the fastener easier to handle. The sloping shoulders 9 formed by bending the arms as described above are shaped on their sides nearest the head so that they may be used on bars of various cross-sections. The V-shaped opening beyond the points of the shoulders provides a pair of cams which are adapted to spread the arms when the fastener is being engaged with a bar.

The arms, when formed as described above, securely grip the flat sides of the supporting bar, yet the fastener may be slid along the bar without removing it from the bar. The grip is strong enough, however, to prevent the cover from slipping out of place of its own accord.

Referring again to the installation as a whole, I prefer to place the apertures in the cover in pairs at opposite sides of the cover near its edge. Thus the top section may be slid downwards, or the bottom section may be moved up towards the top by simply moving the proper pair of fasteners.

The present application is a division of my prior application Serial No. 740,084, filed August 16, 1934. Although the installation described and claimed herein illustrates the use of a novel fastener claimed in my said parent application, it is to be understood that there are other forms of fasteners susceptible of use with my installation.

I claim:

1. The combination with a motor vehicle radiator-protecting grille of, a cover for said grille having an aperture therethrough, and a fastener member securing said cover to said grille, said fastener having means in the form of a head bearing on said cover and a pair of grille-engaging arms extending directly from said head through the aperture in said cover and engaging said grille with a spring action thereby securing said cover to said grille.

2. The combination with an automobile radiator grille consisting of a plurality of relatively rigid bars, of an apertured covering of a size to cover at least a portion of said grille and yieldable fastener means constructed and arranged to engage the cover and to pass through the apertures and engage the grille to hold the cover in place.

WALTER I. JONES.